United States Patent [19]

Troisi et al.

[11] 3,882,768
[45] May 13, 1975

[54] AUTOMATIC DONUT MAKING SYSTEM
[75] Inventors: George A. Troisi, Andover; Julian D. Gordon, Marblehead, both of Mass.
[73] Assignee: Dunkin' Donuts Incorporated, Randolph, Mass.
[22] Filed: Feb. 25, 1974
[21] Appl. No.: 445,430

[52] U.S. Cl................ 99/352; 99/443 C; 198/110
[51] Int. Cl....................... A21b 5/08; A21c 13/02
[58] Field of Search....................... 99/352, 353–354, 99/355, 404, 427, 442, 443 C; 198/110, 203

[56] References Cited
UNITED STATES PATENTS

| | | | |
|---|---|---|---|
| 2,055,639 | 9/1936 | Scheibel............................ | 99/352 X |
| 2,219,410 | 10/1940 | Bradshaw............................. | 99/352 |
| 2,897,772 | 8/1959 | Hunter................................. | 99/352 |
| 3,115,084 | 12/1963 | Anetsberger et al. ................ | 99/352 |
| 3,297,204 | 1/1967 | Adamson........................ | 198/110 X |
| 3,552,300 | 1/1971 | Matzke et al. ......................... | 99/352 |

Primary Examiner—Billy J. Wilhite
Assistant Examiner—Arthur O. Henderson
Attorney, Agent, or Firm—W. R. Hulbert

[57] ABSTRACT

For donut making an automatic reversible conveyor system associated with a proofing chamber accepts developed dough units from a mixing and developing unit and conveys them either through the proofing chamber to a fryer or directly to the fryer, by-passing the proofing chamber, depending on its direction of travel.

5 Claims, 4 Drawing Figures

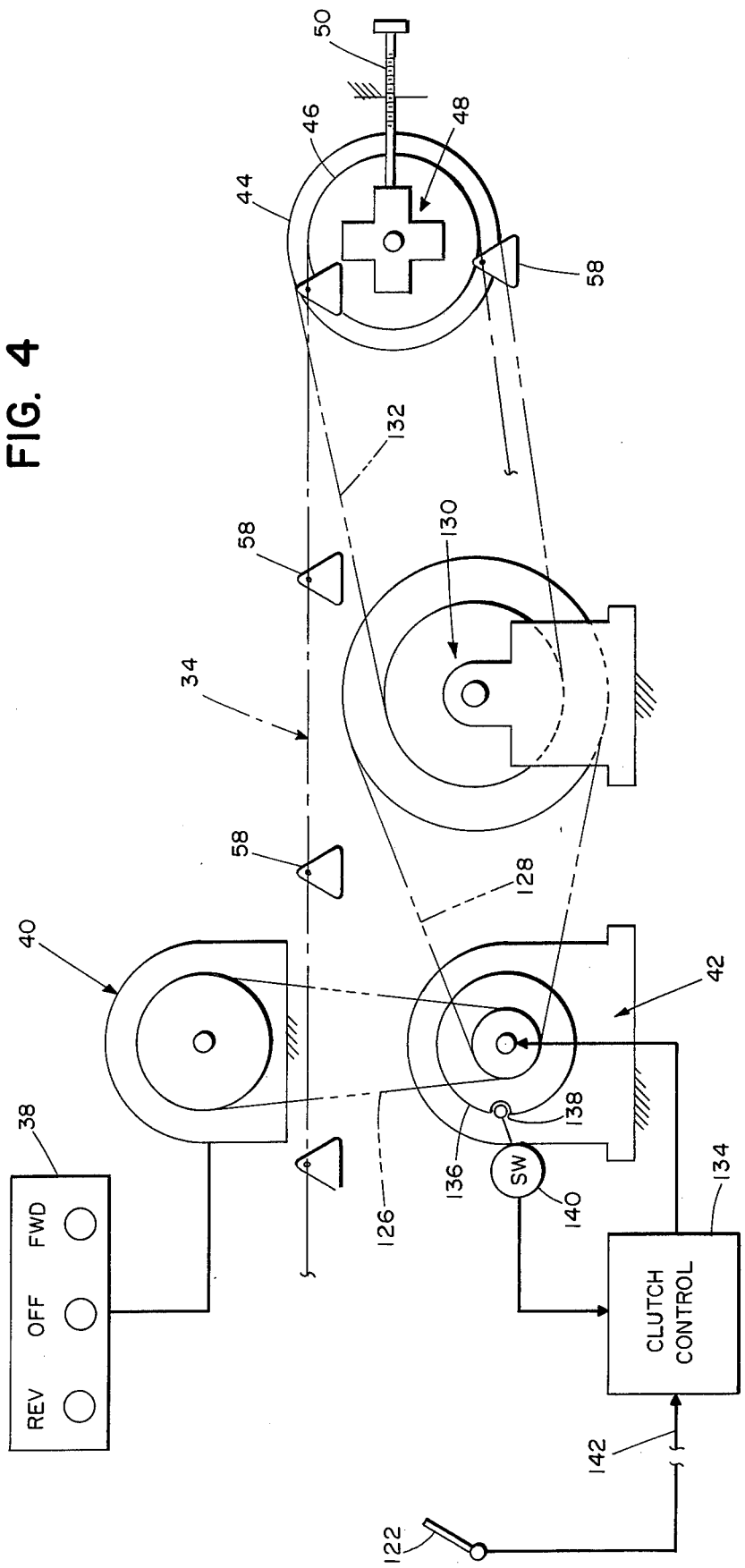

AUTOMATIC DONUT MAKING SYSTEM

This invention relates to donut making systems. In particular, it relates to a donut making system for automatic production of both cake and raised donuts.

Cake donuts and raised donuts differ both in the characteristics of the final product and in the processes by which they are made. Cake donuts are essentially baking powder donuts; the uncooked dough units, after being formed, require no pretreatment before cooking, but may be discharged directly into the cooking oil. Raised donuts, on the other hand, depend on yeast action before cooking. The dough units, after being formed, must be allowed to rise; that is, the yeast must be allowed to grow under controlled conditions of temperature and humidity and for a predetermined time. Such controlled exposure to heat and humidity is provided in a process known as proofing. After the dough units have been proofed they are cooked. It is apparent that in order to produce raised donuts of consistent quality, the exposure to heat and humidity during proofing must be carefully controlled and must be consistent from batch to batch.

In previous donut making systems, intended for producing both cake and raised donuts, various methods have been employed to convey the shaped dough units from the depositor to the cooking oil. In some cases, all shaped dough units have been conveyed by hand, in trays or stacks, directly to the cooking oil or to the proofer as appropriate. In other systems, the operation has been automatic for one type of donut, for example the cake type, such dough units being automatically conveyed directly to the fryer, while the raised type dough units were hand carried to the proofer. Such systems are necessarily only as fast as the person performing the hand operations; furthermore, the raised dough units do not receive uniform treatment in the proofer, since the time they spend there is subject to the operator's availability and possible delays. Consequently such systems have been slower than the other automatically performed operations would otherwise permit, and the final products have not been uniform. In addition, any handling of the donuts during their manufacture may introduce health hazards.

Alternative systems have provided separate equipment for forming cake type and raised donuts, the raised donut forming equipment being located to feed the donuts to a proofer before cooking and the cake donut forming equipment being located immediately before the cooking apparatus. Such an arrangement necessitates additional equipment, and the maintenance of separate supplies of ingredients and duplicate equipment to measure and dispense the ingredients, as well as duplicate equipment to mix and develop the dough.

It is an object of the present invention to provide apparatus for use in a donut making system to enable such a system to produce either cake donuts or raised donuts of consistent characteristics and quality.

It is also an object to provide such apparatus that greatly increases the speed with which donuts may be produced by a donut making system.

It is a further object to provide such apparatus that is suitable for automatic control, as in a completely programmed donut making system.

Finally, it is an object to provide such apparatus that enables a donut making system to produce either cake or raised donuts using a compact fixed assemblage of equipment, without removing or replacing elements of the system, without requiring duplication of equipment, and without interrupting the operation of the equipment to permit an operator to perform part of the work by hand.

According to the invention, there is provided in a donut making system having discharge means for successively discharging shaped dough units, a proofer chamber providing predetermined conditions of temperature and humidity, and a fryer for cooking the dough units into donuts, a combination comprising endless conveyer means, reversible drive means, and control means. The endless conveyer means has a first portion of its length effectively exposed within the proofer chamber and between the discharge means and the fryer, and a further portion of its length effectively not exposed within the proofer chamber and between the discharge means and the fryer. The reversible drive means is connected to the conveyer means for driving it in either of two directions, and the control means is connected to the drive means for selecting either of two directions of drive. Dough units are moved from the discharge means through the first path portion effectively exposed within the proofer chamber for raising of the dough and thence to the fryer when the conveyer means is driven in one direction, and the dough units are moved from the discharge means to the fryer through the further path portion effectively not exposed within the proofer chamber when the conveyer means is driven in the opposite direction.

In preferred embodiments the conveyer means has a plurality of carriers equally spaced throughout its length for conveying the shaped dough units; the reversible drive means successively drives the conveyer means through equal increments of distance at equal time intervals, a carrier being successively at rest in an accept position with respect to the discharge means in which a shaped dough unit is discharged onto the carrier, and an immersing position with respect to the fryer in which the dough unit is within the fryer for cooking and removal from the carrier, regardless of the direction in which the conveyer means is driven between the discharge means and the fryer.

Other objects, features and advantages will appear from the following description of a preferred embodiment of the invention, taken together with the attached drawings thereof, in which:

FIG. 4 shows the drive and control means for the conveyer means.

Figure 1:
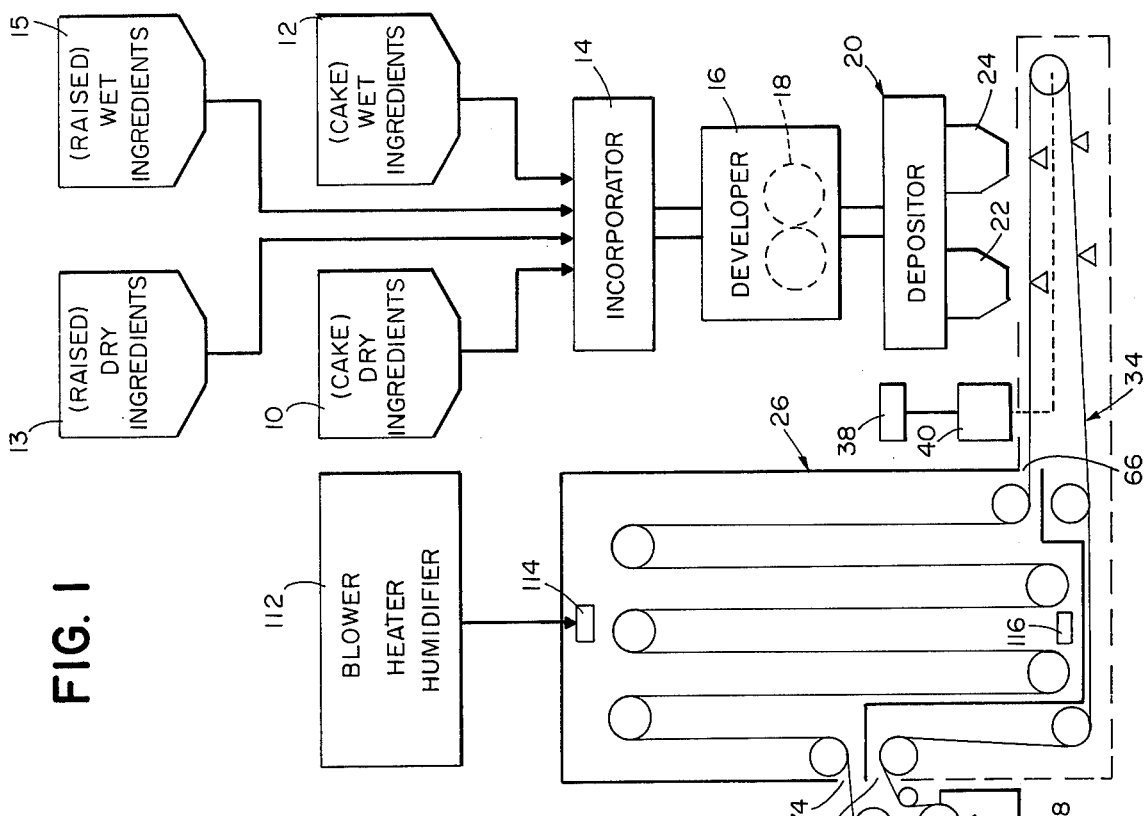
FIG. 1 is a schematic view of a donut making system embodying the present invention.

A donut making system including the apparatus of the present invention is shown schematically in FIG. 1.

The ingredients for cake or raised donuts, including flour, salt, water, yeast or baking powder, and suitable flavorings, are provided in dry or liquid form and are dispensed in measured quantities as desired from suitable storing and measuring apparatus, such as hopper 10 for cake type dry ingredients and hopper 12 for cake type wet ingredients, and hoppers 13 and 15 for raised donut ingredients.

The measured ingredients are initially mixed in suitable mixing apparatus such as incorporator 14, from which they are continuously advanced by suitable pumping means, not shown, to a developer 16. A suitable developer and pumping means are shown, for example, in U.S. Pat. No. 3,635,171. The developer includes agitating means such as paddles 18 which work the dough to a developed condition.

From developer 16 the developed dough is moved to depositor 20. A suitable depositor is shown, for example, in U.S. Pat. No. 3,708,255. Depositor 20 has at least two discharge means, one at 22 for discharging shell dough units (without holes) and one at 24 for discharging ring dough units (with holes). In order to simplify the description of the donut making system shown herein, it is assumed that shell form donuts are made only of raised dough and that ring formed donuts are made only of cake dough. In practice other combinations may be made. Other discharge means for additional forms of dough units may be added to depositor 20 as desired but are not shown herein.

A proofer chamber 26, to be described in greater detail in what follows, is provided adjacent the depositor discharge means. A fryer 28 is provided adjacent proofing chamber 26, and a glazer 30 and stacker 32 may also be provided.

According to the invention, novel automatically controlled means are provided to convey the shaped dough units from depositor 20 either directly to fryer 28 or alternatively through proofer 26 to fryer 28. An endless conveyer 34 provides alternate paths between depositor 20 and fryer 28. One path is through proofing chamber 26 and is effectively exposed to conditions within chamber 26; the alternate path is effectively not exposed to chamber 26, as will be explained in what follows. Drive means including a motor 40 is provided to drive conveyer 34 in either of two directions, as controlled by control means 38.

Figure 3:
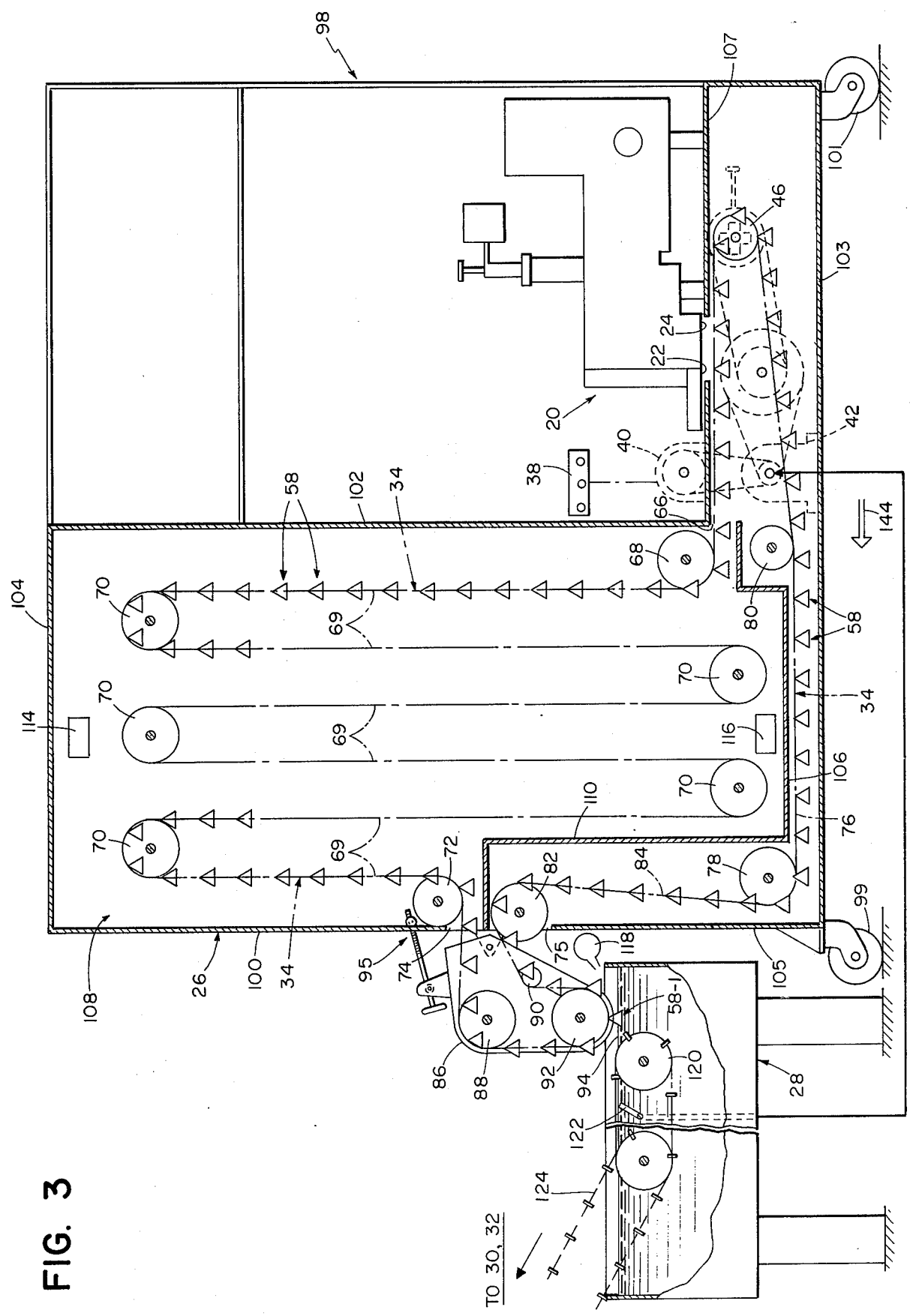
FIG. 3 is a more detailed view of the donut making system.

Proofing chamber 26 is shown schematically in FIG. 1 and in more detail in FIG. 3. As seen in FIG. 3, the proofing chamber 26 conveniently forms part of a larger frame unit 98, supported on wheels at 99 and 101, and providing appropriate framework as at 107 to support developer 16 and depositor 20, as well as other portions of the overall system as desired. Frame unit 98 provides a floor 103, and a side wall portion 105. The proofing chamber 26 is enclosed by side walls 100 and 102, upper wall 104, a front wall not shown in the figures and preferably removable, a back wall 108, and, in preferred embodiments, a partition wall 110 and lower wall 106. The atmosphere within the proofing chamber is maintained at uniform conditions of humidity and heat (preferably about 115°F and 60 percent relative humidity) by means of a blower, heater and humidifier unit 112 (FIG. 1), which supplies treated air to an inlet 114 in back wall 108 of chamber 26. From inlet 114 the treated air is drawn downward through chamber 26 and is withdrawn from the chamber at outlet 116, to be treated and recirculated by unit 112. An entrance port 66 is provided in side wall 102 and an upper exit port 74 is provided in side wall 100. A lower exit port 75 is provided between lower side wall 105 and partition wall 110.

Figure 2:
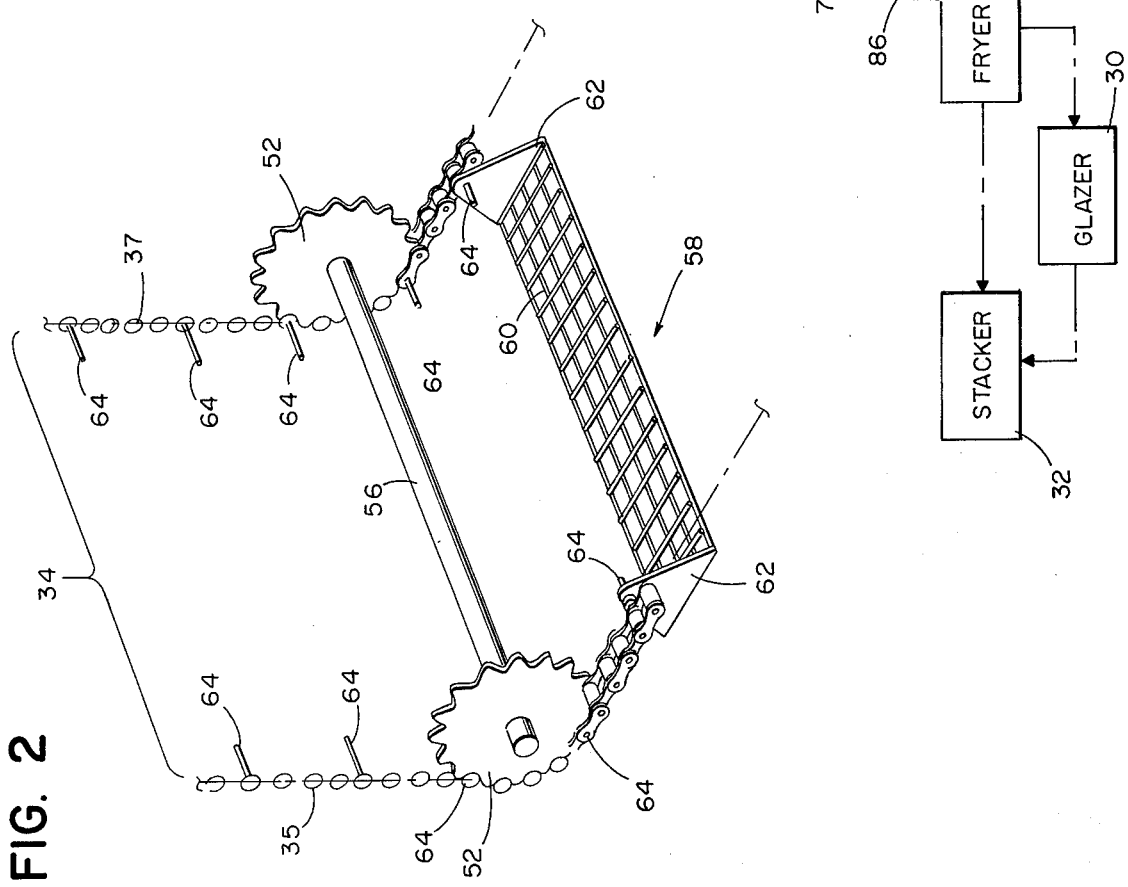
FIG. 2 is a detail view of a portion of the conveyer means.

Referring now particularly to FIG. 2, the endless conveyer 34 comprises two chains 35 and 37, such as ASA standard roller chain No. 35, spaced apart about 18 inches, which move parallel to each other along a path determined by pairs of sprocket wheels such as 52 and 52 on a common axle 56. Conveyer 34 provides a plurality of carriers 58, each comprising a flat wire screen portion 60 for supporting the dough unit and two side portions 62, each side portion being suspended from one of roller chains 35 or 37, through a pivot pin 64. Thus screen portion 60 remains horizontal at all times while conveyer 34 moves horizontally, vertically, and along inclined paths. In the embodiment shown herein, screen portion 60 is adapted to carry four shaped dough units. Carriers 58 are equally spaced along conveyer 34, each two being separated by 4.5 inches.

Endless conveyer 34 describes a closed path, which may be regarded as composed of two alternate paths between depositor 20 and fryer 28. The first alternate path is extended within proofing chamber 26 and is effectively exposed to the conditions therein. The second alternate path either lies wholly external to the proofing chamber, in some embodiments, or in other embodiments extends through the chamber for so short a distance that dough units carried along this path remain substantially unaffected by the conditions in chamber 26. Such a path is herein defined as "effectively not exposed" within chamber 26. In the embodiment shown in the drawings, the second path lies partially within proofer 26 but is shielded therefrom by partition wall 110 and lower wall 106.

Considering first the portion of the conveyer path through proofing chamber 26 (for raised donuts), conveyer 34 enters chamber 26 horizontally at entrance port 66 in side wall 102 and passes around the pair of sprocket wheels 68; the path of conveyer 34 within chamber 26 comprises six long vertical flights 69 with reversals of direction at the five sprocket wheel pairs 70, together with approximately 90° turns at wheels 68 and 72 at the entrance 66 and exit 74. The level of wheels 72 at exit 74 is adjustable to compensate for any slight irregularities in the floor on which the apparatus stands.

The alternate path (for cake type donuts) effectively not exposed to proofing chamber 26 includes a substantially horizontal flight 76 that passes between lower wall 106 of chamber 26 and floor 103 of frame units 98, between wheels 80 and 78. A further flight 84 of the conveyer is slightly inclined to the vertical, between wheels 78 and wheels 82 at lower exit port 75 (between side wall 105 of frame unit 98 and partition wall 110).

If partition wall 110 and lower wall 106 are omitted from the construction of the proofing chamber, then the carrier 58 will pass briefly within the proofing chamber when moving through conveyer flights 76 and 84. In relatively small units the conveyer speed and the length of flights 76 and 84 are such that cake type dough is not significantly affected by the resulting exposure to the heat and himidity of chamber 26 and such a path is not effectively exposed therein; however, in larger units, the exposure may be great enough to adversely affect the quality of the donuts, and either partition 110 or lower wall 106, or both, as in the present embodiment, are therefore provided.

At the exit end of chamber 26, a proofer discharge conveyer assembly 86 is provided, to determine the path of conveyer 34 between frame unit 98 and fryer 28. The endless conveyer 34 passes around wheels 72 at upper exit port 74 in side wall 100, and then passes around three pairs of sprocket wheels 88, 90 and 92 supported in assembly 86, before returning to frame unit 98 by passing over sprocket wheels 82 at lower port 75. The lowest (or immersing) carrier position 58-1 is arranged to be within fryer 28. As some donut products require complete initial immersion in the cooking oil while others should be only partially immersed, a fine level control for the proofer discharge conveyer assembly 86 is provided at 95, permitting a small adjustment in the relative position of oil surface 94 in fryer 28 and screen portion 60 of carrier 58 when it is in immersing position 58-1. The dough unit after immersion floats in the oil and is urged away from carrier 58 by the action of blower 118 or other suitable means well known in the art. A fryer conveyer 120 carries the cooking dough units away from assembly 86. A flipper 122 is provided in fryer 28 downstream from the immersing position 58-1 of conveyer 34, and is automatically timed by means not shown to flip the donuts within the cooking oil every 14 seconds to permit cooking of the reverse sides. After cooking, the donuts are removed at 124 to be carried to the glazer and stacker as appropriate.

According to the invention, endless conveyer 34 is adapted to move in either of two directions, and appropriate drive means are provided. The drive means are located, in the embodiment shown herein, behind the conveyer 34 as shown in FIG. 3 and are indicated in phantom in that figure, and seen in more detail in FIG. 4. A reversible motor 40 drives clutch 42 through belt 126. The output of cluth 42 is connected through belt 128, wheel 130 and belt 132 to takeup pulley 44, which is on a common shaft with sprocket drive wheels 46 which drive endless conveyer 34. Motor 40 is controlled at 38, and runs continuously either forward or backward when appropriately controlled. The engagement of clutch 42 is controlled by clutch control means 134. A round collar cam 136 is provided on clutch 42 having a notch 138; a switch 140 is held open by notch 138. An electrical feedback signal at 142 from flipper 122 in fryer 28 (see FIG. 3) is input to clutch control 134 each time the flipper operates. This signal overrides switch 140, causing cam 136 to rotate, and the intact portion of the cam perimeter then holds switch 140 closed for the remainder of a complete revolution of cam 136, causing the clutch to be engaged. When switch 140 is again opened by notch 138, the clutch is disengaged and remains in that condition until a subsequent signal is received at 142 from flipper 122.

Each revolution of cam 136 causes drive wheels 46 to advance endless conveyer 34 through 4.5 inches. In the present embodiment, such advance takes about 2 to 4 seconds, and for an additional 12 or 10 seconds the conveyer 34 is at rest. A complete cycle is about 14 seconds.

Other suitable drive means and control means may be provided. It is necessary that the start and stop of the conveyer be not so abrupt as to dislodge the dough units from the carriers 58, which pivot freely about pins 64.

As the endless conveyer 34 as shown herein does not provide continuous carrying means, but rather provides spaced carriers 58, it will be appreciated that, regardless of the direction of operation of the system, a carrier must always be precisely positioned in an accept position at the discharge means 22 or 24 at the time when conveyer 34 stops and a dough unit is discharged; likewise, a carrier 58 must always occupy the lowest or immersing position 58-1 in proofer discharge conveyer assembly 86, precisely determined with respect to the level 94 of cooking oil in fryer 28, when conveyer 34 stops. Hence the lengths of the alternate paths between the discharge means and the fryer must each be integral multiples of some common distance increment, in this embodiment 4.5 inches.

If the alternate path that is effectively not exposed within the proofing chamber is not shielded by a structure such as partition 110 and lower wall 106, its length within chamber 26 must be substantially shorter than the extended path. The extended path must be at least about 12 times as long as the effectively not exposed path, and preferably about 20 times as long. In any event, the time of exposure of the dough units on the effectively not exposed path does not exceed about one minute. In the present embodiment, the extended path is about 20 times as long, and partition wall 110 and lower wall 106 could be omitted.

In operation, to make cake type donuts (ring shape with holes), the operator of the donut making system selects the appropriate quantities of ingredients from hoppers 10 and 12, and sets the controls of depositor 20 to form ring donuts and to discharge them from discharge means 24. He further sets motor control 38 to cause motor 40 to drive conveyer 34 in the sense of arrow 144 (FIG. 3) and sets the timing means (not shown) to operate flipper 122. Conveyer 34 is advanced in the sense of arrow 144 in increments of 4.5 inches. As each carrier 58 pauses beneath discharge means 24, four (or in some embodiments two) formed cake donut rings are placed on screen 60. Carrier 58 is carried around drive wheels 44 to pass beneath wheels 80 adjacent entry port 66 of proofing chamber 26; it then passes through the section 76 between lower wall 106 of proofing chamber 26 and floor 103 of frame unit 98, makes a turn of slightly more than 90° at wheels 78, and is carried up between lower side wall 105 of frame 98 and partition wall 110 of proofing chamber 26 to wheels 82. Carrier 58 passes over wheels 82 and out through lower exit port 75, and its path is then controlled by proofer discharge conveyer assembly wheels 90, 92, and 88; carrier 58 occupies position 58-1 during a time when conveyer 34 is at rest. The donuts are removed as previously described, and the carrier returns, empty, through proofing chamber 26 to be again filled at depositor 20.

Alternatively, to make raised type donuts (shell form without holes), the operator selects the appropriate quantities of ingredients from hoppers 13 and 15 and sets the controls of depositor 20 to form shell dough units and to discharge them at 22. He further sets control 38 of motor 40 to drive conveyer 34 in the opposite sense to that of arrow 144. Dough units are deposited at 22 onto carriers 58, which then enter proofing chamber 26 at entry port 66, and are carried through the long convoluted path therein to expose the dough units to the proofing conditions for an appropriate length of time, about 22 minutes in the embodiment shown herein. The proofed dough units emerge at upper exit 74 and are carried into fryer 28 by proofer discharge conveyer assembly 86. The empty carriers are returned empty beneath proofing chamber lower wall 106 and are again filled at discharge means 22.

It will be seen that a donut making system according to the present invention is economical of both space and time. A single unit 98 houses the major part of the equipment; a single depositor is employed to form both cake and raised type dough units; a single conveyer means 34 is employed in either case to transfer the formed dough units to the fryer 28. No units of equipment need be removed or interchanged. A single control 38 is used to determine whether or not the formed dough units pass through proofing chamber 26 on their way to fryer 28; control 38 is adapted to be included in a completely programmed donut making system.

A donut making system according to the present invention can make four donuts in 14 seconds, or about 85.6 dozen donuts in an hour, while a system requiring the intervention of a person to convey dough units to a proofer can produce about 200 to 225 dozen in an 8 hour shift. Further, the donuts produced by a system embodying the present invention are of superior quality and uniform characteristics.

What is claimed is:

1. In a donut making system having discharge means for successively discharging shaped dough units, a proofer chamber providing predetermined conditions of temperature and humidity, and a fryer for cooking said dough units into donuts, the combination comprising
endless conveyer means having a first path portion effectively exposed within said proofer chamber and between said discharge means and said fryer, and a further path portion effectively not exposed within said proofer chamber and between said discharge means and said fryer,
reversible drive means connected to said conveyer means for driving said conveyer means in either of two directions, and
control means connected to said drive means for selecting either of two directions of drive,
whereby said dough units are moved from said discharge means through said first path portion effectively exposed within said proofer chamber for raising of the dough and to said fryer when said conveyer means is driven in one direction, and said dough units are moved from said discharge means to said fryer through said further path portion effectively not exposed within said proofer chamber when said conveyer means is driven in the opposite direction.

2. The combination of claim 1 wherein said further path portion is external to said proofer chamber.

3. In a donut making system having discharge means for successively discharging shaped dough units, a proofer chamber providing predetermined conditions of temperature and humidity, and a fryer for cooking said dough units into donuts, the combination comprising
endless conneyer means having a first path portion extended within said proofer chamber and between said discharge means and said fryer, and a further path portion not exposed to said proofer between said discharge means and said fryer, the length of said first path portion being at least about 12 times the length of said further path portion,
reversible drive means connected to said conveyer means for driving said conveyer means in either of two directions, and
control means connected to said drive means for selecting either of two directions of drive,
whereby said dough units are moved from said discharge means through first path portion extended within said proofer chamber for raising of the dough and to said fryer when said conveyer means is driven in one direction, and said dough units are moved from said discharge means to said fryer through said further path portion when said conveyer means is driven in the opposite direction.

4. The combination of claim 2, wherein
said conveyer means has a plurality of spaced carriers for conveying said shaped dough units,
the lengths of said conveyer means first path portion and further path portion being each an integral multiple of a common distance increment,
whereby a said carrier successively occupies an accept position with respect to said discharge means in which a shaped dough unit is discharged onto said carrier, and an immersing position with respect to said fryer in which said dough unit is within said fryer for cooking and removal, regardless of the direction in which said conveyer means is driven between said discharge means and said fryer.

5. In a donut making system having
discharge means for successively discharging shaped dough units at equal time intervals, a proofer chamber providing predetermined conditions of temperature and humidity, and a fryer for cooking said dough units into donuts, the combination comprising
endless conveyer means having a first path portion effectively exposed within said proofer chamber and between said discharge means and said fryer, and a further path portion effectively not exposed within said proofer chamber and between said discharge means and said fryer,
said conveyer means having a plurality of carriers equally spaced throughout its length for conveying said shaped dough units,
reversible drive means connected to said conveyer means for successively driving said conveyer means through equal distance increments at equal time intervals,
control means connected to said drive means for selecting either of two directions of drive,
the lengths of said conveyer means first path portion and further path portion being each an integral multiple of said distance increment, and the length of said first path portion being at least about twenty times the length of said further path portion,
a said carrier being successively at rest in an accept position with respect to said discharge means in which a shaped dough unit is discharged onto said carrier, and an immersing position with respect to said fryer in which said dough unit is within said fryer for cooking and removal from said carrier, regardless of the direction in which said conveyer means is driven between said discharge means and said fryer,
whereby said dough units are removed from said discharge means through said first path portion effectively exposed within said proofer chamber for raising of the dough and to said fryer when said conveyer means is driven in one direction, and said dough units are moved from said discharge means to said fryer through said further path portion effectively not exposed within said proofer chamber when said conveyer means is driven in the opposite direction.

* * * * *